(12) United States Patent
Shimizu et al.

(10) Patent No.: US 12,240,399 B2
(45) Date of Patent: Mar. 4, 2025

(54) WORK VEHICLE

(71) Applicant: Kubota Corporation, Osaka (JP)

(72) Inventors: Ryota Shimizu, Sakai (JP); Hiroyuki Suzuki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/130,988

(22) Filed: Apr. 5, 2023

(65) Prior Publication Data

US 2023/0331183 A1    Oct. 19, 2023

(30) Foreign Application Priority Data

Apr. 13, 2022   (JP) .................................. 2022-066362

(51) Int. Cl.
*B60R 21/13* (2006.01)
(52) U.S. Cl.
CPC .................................... *B60R 21/13* (2013.01)
(58) Field of Classification Search
CPC .............................. B60R 21/131; B60R 21/13
See application file for complete search history.

(56) References Cited

U.S. PATENT DOCUMENTS

| | | | |
|---|---|---|---|
| 6,523,879 B2* | 2/2003 | Mizuta | B60R 21/131 296/193.06 |
| 7,261,321 B2* | 8/2007 | Della Valle | B60R 21/131 280/756 |
| 9,815,412 B1* | 11/2017 | Tsumiyama | B60J 1/006 |
| 10,640,151 B2* | 5/2020 | Hisamura | B62D 25/088 |
| 10,800,470 B2* | 10/2020 | Barkey | B62D 21/12 |
| 11,400,896 B2* | 8/2022 | Yamamoto | B62D 21/183 |
| 11,448,311 B2* | 9/2022 | Davis | F16H 57/0489 |
| 2001/0007396 A1* | 7/2001 | Mizuta | B62D 33/0625 296/193.11 |
| 2001/0054832 A1* | 12/2001 | Mizuta | B60N 3/02 296/205 |
| 2005/0156422 A1* | 7/2005 | Della Valle | B60R 21/131 280/756 |
| 2014/0144719 A1* | 5/2014 | Morgan | B60T 1/062 180/65.31 |
| 2017/0327049 A1* | 11/2017 | Tsumiyama | B60J 1/006 |
| 2018/0178677 A1* | 6/2018 | Swain | F01P 5/02 |
| 2019/0211915 A1* | 7/2019 | Davis | B60R 21/13 |

(Continued)

FOREIGN PATENT DOCUMENTS

JP           201713688 A      1/2017

*Primary Examiner* — Paul N Dickson
*Assistant Examiner* — Maxwell L Meshaka
(74) *Attorney, Agent, or Firm* — The Webb Law Firm

(57) ABSTRACT

Provided is a work vehicle including left and right front wheels located in a front portion of a vehicle body of the work vehicle; left and right rear wheels located in a rear portion of the vehicle body; a driver section located at an intermediate position of the vehicle body in a front-rear direction, and including a driver seat; a ROPS frame including left and right front columns and left and right rear columns, and covering the driver section; and a plurality of suspension mechanisms supporting the front wheels and the rear wheels to the vehicle body in such a manner that the front wheels and the rear wheels are individually movable up and down, and wherein the ROPS frame is attached to positions immediately above, or in a vicinity of, vehicle body-side support sections of the suspension mechanisms.

5 Claims, 2 Drawing Sheets

(56) References Cited

U.S. PATENT DOCUMENTS

| | | | |
|---|---|---|---|
| 2019/0300064 A1* | 10/2019 | Hisamura | B62D 23/005 |
| 2020/0017153 A1* | 1/2020 | Barkey | B62D 21/12 |
| 2020/0156582 A1* | 5/2020 | Davis | B60R 21/13 |
| 2020/0406828 A1* | 12/2020 | Simonin | B60P 7/0807 |
| 2021/0155191 A1* | 5/2021 | Gordon | B62D 23/00 |
| 2022/0126797 A1* | 4/2022 | Yamamoto | G05G 5/005 |
| 2022/0219574 A1* | 7/2022 | Hamamura | B60N 2/0292 |
| 2022/0306222 A1* | 9/2022 | Deckard | B60K 1/00 |
| 2023/0034666 A1* | 2/2023 | Davis | F16H 61/662 |
| 2023/0331183 A1* | 10/2023 | Shimizu | B60R 21/13 |

* cited by examiner

WORK VEHICLE

CROSS REFERENCE TO RELATED APPLICATION

This application claims priority to Japanese Patent Application No. 2022-066362 filed on Apr. 13, 2022, the disclosure of which is hereby incorporated by reference in its entirety.

BACKGROUND OF THE INVENTION

1. Field of the Invention

The present invention relates to a work vehicle provided with a ROPS (Roll-Over Protective Structure) frame covering a driver section.

2. Description of the Related Art

Work vehicles having a structure in which a driver section is covered with a ROPS frame are often used for not only transport of materials or the like but also transport of personnel, and examples of conventional work vehicles that are easy to use for such multiple purposes include a work vehicle with the following configuration.

That is, the ROPS frame includes left and right front columns, and left and right rear columns, the left and right front columns are supported at left and right-side positions in a front portion of the driver section, and the left and right rear columns are supported at left and right-side positions in a rear portion of the driver section (see, for example, JP 2017-13688A).

As described above, work vehicles for use for multiple purposes may travel on a heavily uneven and irregular ground or the like, and a reactive force from the ground to the wheels during the travel may act on the vehicles. However, although, in the above-described conventional configuration, support elements for increasing rigidity are provided at positions at which the wheels receive a reactive force from the ground so that the reactive force is received on the vehicle body side, the support structure of the conventional configuration is not sufficient in view of increasing the rigidity of the entire vehicle.

SUMMARY OF THE INVENTION

Therefore, in view of the foregoing, there is a demand for increased rigidity of the entire vehicle that is obtained by changing the vehicle body support structure.

A work vehicle according to the present invention comprises:
left and right front wheels located in a front portion of a vehicle body of the work vehicle;
left and right rear wheels located in a rear portion of the vehicle body;
a driver section located at an intermediate position of the vehicle body in a front-rear direction, and including a driver seat;
a ROPS frame including left and right front columns and left and right rear columns, and covering the driver section; and
a plurality of suspension mechanisms supporting the front wheels and the rear wheels to the vehicle body in such a manner that the front wheels and the rear wheels are individually movable up and down, wherein
the ROPS frame is attached to positions immediately above, or in a vicinity of, vehicle body-side support sections of the suspension mechanisms.

According to the present invention, a force received on the vehicle body side in response to the wheels receiving a reactive force from the ground is transmitted to the vehicle body side via the wheels and the suspension mechanisms. Also, since the ROPS frame is attached to positions immediately above, or in a vicinity of, the vehicle body-side support sections of the suspension mechanisms, the force transmitted to the vehicle body side is strongly received and supported by the rigid vehicle body-side support sections including the ROPS frame.

As a result, the rigidity of the entire vehicle body is increased, and a force transmitted to the vehicle body via the wheels can be received by the support structures on the vehicle body side including the ROPS frame, efficiently and effectively.

In the present invention, preferably, the left and right front columns of the ROPS frame are respectively attached to positions immediately above, or in a vicinity of, the vehicle body-side support sections of left and right suspension mechanisms supporting the left and right front wheels, among the plurality of suspension mechanisms.

According to this configuration, even if a strong force acts on the front wheels due to unevenness on the ground during the travel of the vehicle body, the force can be stably received by the ROPS frame with high rigidity via the suspension mechanisms.

In the present invention, preferably, the ROPS frame includes: a front lateral frame section connected to upper portions of the left and right front columns and extending in a left-right direction; a rear lateral frame section connected to upper portions of the left and right rear columns and extending in the left-right direction; and left and right longitudinal frame sections respectively connected to the upper portions of the left and right front columns and the upper portions of the left and right rear columns and extending in a front-rear direction, and the front lateral frame section is located above a front portion of the driver section, and the rear lateral frame section is located above a rear portion of the driver section.

According to this configuration, as a result of the left and right front columns, the left and right rear columns, the front lateral frame section, the rear lateral frame section, and the left and right longitudinal frame sections being coupled to each other as one piece, the ROPS frame can increase rigidity and can favorably protect an occupant who is seated in the driver section.

In the present invention, preferably, the front column includes a grip for an occupant.

According to this configuration, the occupant can hold the grip to maintain his or her orientation even when the work vehicle travels on an uneven road surface.

DESCRIPTION OF THE INVENTION

The following will describe embodiments of the present invention with reference to the drawings. Note that, in the following description, unless otherwise noted, an arrow "F" indicates a direction to a "front side of the vehicle body" (see FIGS. 1 and 2), an arrow "B" indicates a direction to a "rear side of the vehicle body" (see FIGS. 1 and 2), an arrow "L" indicates a direction to a "left side of the vehicle body" (see FIG. 2), and an arrow "R" indicates a direction to a "right side of the vehicle body" (see FIG. 2).

Figure 1:
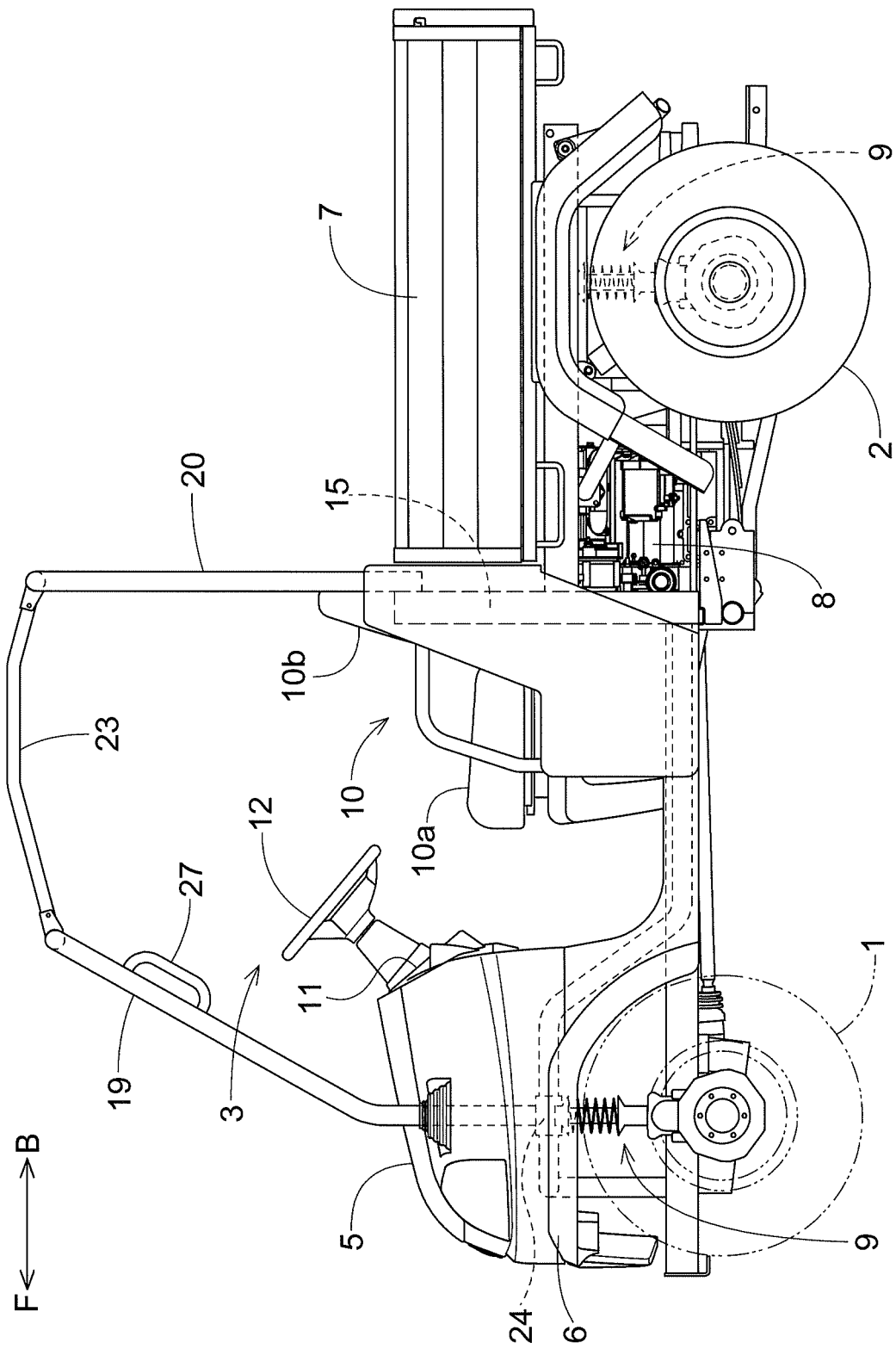
FIG. 1 is a side view illustrating a work vehicle.
Figure 2:
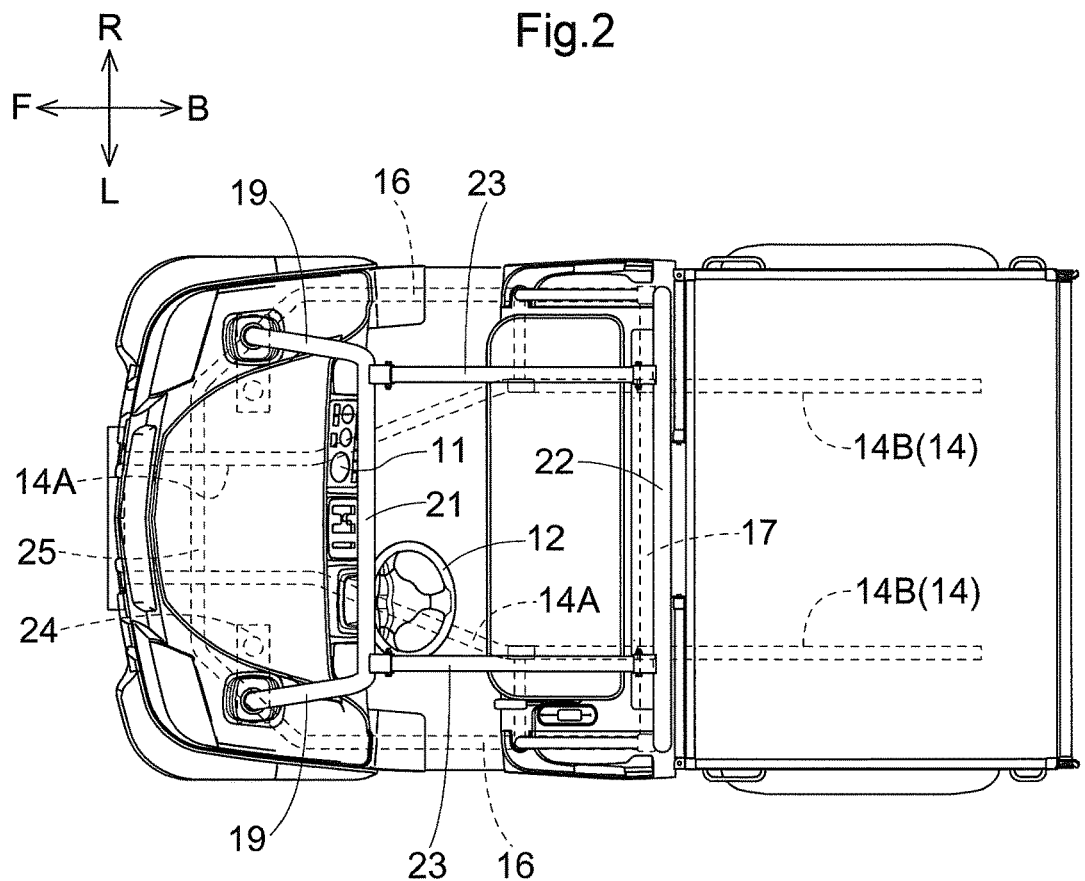
FIG. 2 is a plan view illustrating the work vehicle.

FIGS. 1 and 2 show a utility vehicle as an example of the work vehicle according to the present invention. In the work vehicle, left and right front wheels 1 are supported on a front portion of a vehicle body, and left and right rear wheels 2 are supported on a rear portion of the vehicle body. A driver section 3 is provided between the front wheels 1 and the rear wheels 2, a bonnet 5 and a front fender 6 are provided on the front side of the driver section 3, and a loading platform 7 is provided on the rear side of the driver section 3.

As shown in FIGS. 1 and 2, an engine 8, a not-shown transmission case, and the like are provided below the loading platform of the rear portion of the vehicle body. Power from the transmission case is transmitted to the left and right rear wheels 2 via a differential unit (not shown) for the rear wheels. Also, power from the transmission case is transmitted to the front wheels 1 via a transmission shaft and a differential unit for the front wheels, although they are not shown.

A plurality of suspension mechanisms 9 are provided that support the front wheels 1 and the rear wheels 2 to the vehicle body in such a manner that the individual wheels are movable up and down. This work vehicle may move and travel on an uneven road surface. In order to suppress vibration of the vehicle body even when the wheels are moved up and down due to the unevenness, the front wheels 1 and the rear wheels 2 are supported via swing movement support mechanisms so as to be movable up and down relative to the differential mechanisms, and the suspension mechanisms 9 are provided to buffer the up and down movement of the wheels. The suspension mechanisms 9 are strut suspension mechanisms, which are however not described in detail.

The driver section 3 includes a driver seat 10, and the driver seat 10 has a seating part 10*a* and a backrest part 10*b*. The driver seat 10 is elongated in a left-right direction, and can accommodate two persons. A drive panel 11 provided in front of the driver seat 10 is provided with a steering wheel 12 that enables steering of the front wheels 1, and various types of operation tools such as a speed change operation tool. The steering wheel 12 is arranged so that an occupant who is seated on the left side can perform a driving operation.

Figure 3:
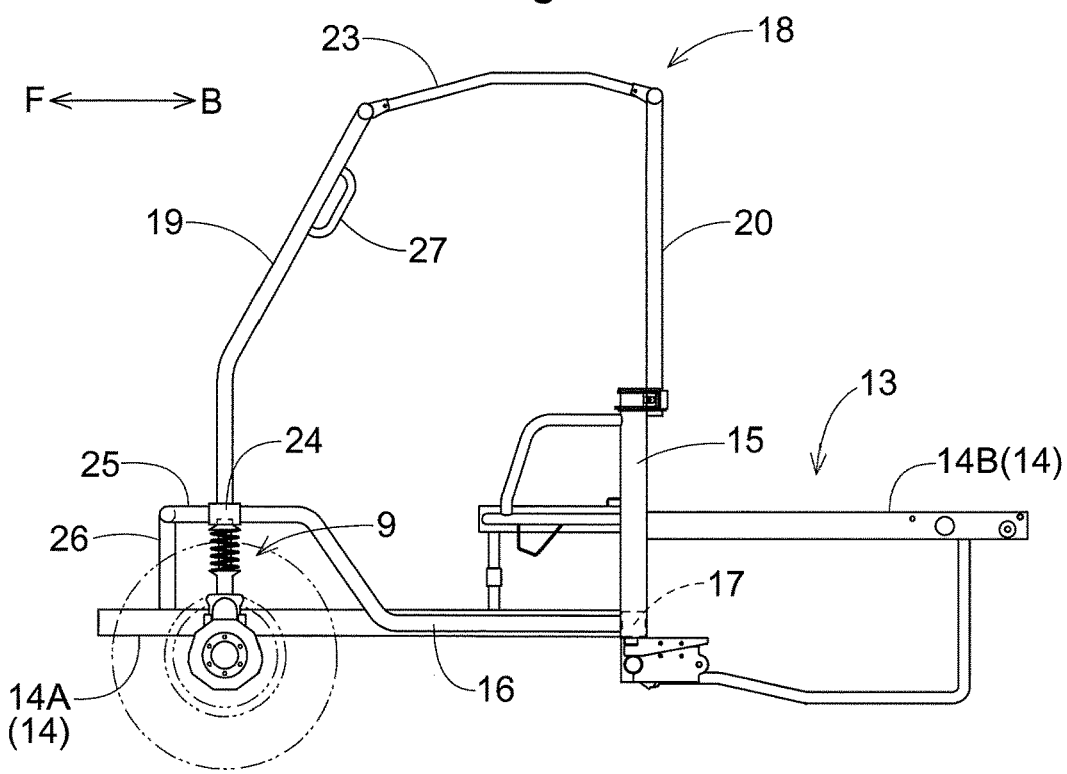
FIG. 3 is a side view illustrating a frame configuration.

As shown in FIG. 3, a vehicle body frame 13 that supports the entire vehicle body includes: a pair of left and right main frames 14 that support the entire vehicle body; left and right vertical frames 15 that extend in an up-down direction at respective positions on lateral sides of a rear portion of the driver section 3 while being supported on the main frame 14; lateral side frames 16 that extend from lower ends of the respective vertical frames 15 along lateral side portions of the driver section 3 in a front-rear direction, and have front portions extending obliquely upward along the front fender 6; and the like.

The main frames 14 include front portion main frames 14A that are provided in the front portion of the vehicle body and are located at lower positions below the vehicle body, and rear portion main frames 14B that are provided in the rear portion of the vehicle body and are located at higher positions. The left and right vertical frames 15 are coupled to rear ends of the left and right front portion main frames 14A via a lateral coupling part 17. Rear ends of the lateral side frames 16 are respectively coupled to the lower ends of the vertical frames 15.

A ROPS frame 18 is provided covering an upper portion of the driver section 3. The ROPS frame 18 is supported on the vehicle body frame 13. The ROPS frame 18 includes: left and right front columns 19 that extend from left and right-side positions in the front portion of the driver section 3 in the up-down direction; and left and right rear columns 20 that extend from left and right-side positions in the rear portions of the driver section 3 in the up-down direction.

The ROPS frame 18 includes: in addition to the left and right front columns 19 and the left and right rear columns 20, a front lateral frame section 21 that is located above the front portion of the driver section 3 and extends in the left-right direction; a rear lateral frame section 22 that is located above the rear portion of the driver section 3 and extends in the left-right direction; and left and right longitudinal frame sections 23 that are connected between upper portions of the left and right front columns 19 and upper portions of the left and right rear columns 20, and extend in the front-rear direction.

The left and right front columns 19, the left and right rear columns 20, the front lateral frame section 21, the rear lateral frame section 22, and the left and right longitudinal frame sections 23 are coupled to each other as one piece. With such a configuration, the ROPS frame 18 functions as a protective member for increasing rigidity and protecting the occupant.

The right front column 19 is disposed at a position ahead of the seating part 10*a* of the driver seat 10 on a right and laterally outer side, and the left front column 19 is disposed at a position ahead of the seating part 10*a* of the driver seat 10 on a left and laterally outer side. The right rear column 20 is disposed at a position behind the backrest part 10*b* of the driver seat 10 on the right and laterally outer side, and the left rear column 20 is disposed at a position behind the backrest part 10*b* of the driver seat 10 on the left and laterally outer side.

The left and right rear columns 20 of the ROPS frame 18 are respectively coupled to and supported by upper ends of the left and right vertical frames 15. The left and right front columns 19 of the ROPS frame 18 are respectively attached to positions immediately above, or in a vicinity of, vehicle body-side support sections 24 of the left and right suspension mechanisms 9 that support the left and right front wheels 1.

The left and right front columns 19 extend from the positions at which they are coupled to the front lateral frame section 21 toward the vehicle body-side support sections 24 that support the upper ends of the suspension mechanisms 9, and the lower ends of the left and right front columns 19 are coupled to the vehicle body-side support sections 24. Since the front lateral frame section 21 is located in the upper front portion of the driver section 3, the left and right front columns 19 extend in a rearward inclined orientation when viewed in a side view in a manner such that the left and right front columns 19 are located forward as they extend downward. Alternatively, the left and right front columns 19 extend in an orientation in a forward-expanding shape when viewed in a plan view in a manner such that the distance between the left and right front columns 19 in the left-right direction increases toward the front side.

The left and right vehicle body-side support sections 24 are coupled by a coupling member 25 that extends in the left-right direction while passing by side positions in the front portion of the vehicle body. An intermediate portion of the coupling member 25 in the left-right direction is supported on the left and right front portion main frames 14A by a vertical support member 26 that extends in the up-down direction.

A grip 27 for an occupant is provided at an upper-side position of the right front column 19. An occupant who is seated on the driver seat 10 on the right side and does not perform any steering operation can hold the grip 27 during travel, and can maintain his or her orientation.

As described above, since the ROPS frame 18 is attached to positions immediately above, or in a vicinity of, the vehicle body-side support sections 24 of the suspension mechanisms 9, it is possible to receive a force transmitted from the ground to the vehicle body via the wheels, using the vehicle body frame 13, which serves as a vehicle body-side support structure including the ROPS frame 18, and increase the rigidity of the entire vehicle body.

Another Embodiment (1) The above-described embodiment has described a configuration in which the left and right front columns 19 extend in a forward-expanding shape when viewed in a plan view, but instead of this configuration, a configuration is also possible in which the left and right front columns 19 extend in a forward tapered shape when viewed in a plan view in a manner such that the distance between the left and right front columns 19 in the left-right direction decreases toward the front side, or the left and right front columns 19 extend in parallel to each other in the front-rear direction when viewed in a plan view.

(2) The above-described embodiment has described a configuration in which the left and right front columns 19 are respectively attached to positions immediately above, or in a vicinity of, the vehicle body-side support sections 24 of the left and right suspension mechanisms 9 that support the front wheels, and the left and right rear columns 20 are supported at positions apart from the vehicle body-side support sections 24 of the suspension mechanisms 9, but instead of this configuration, a configuration is also possible in which the left and right rear columns 20 are also attached to positions immediately above, or in a vicinity of, the vehicle body-side support sections 24 of the left and right suspension mechanisms 9.

(3) The above-described embodiment has described a configuration in which the driver seat 10 is elongated in the left-right direction and can accommodate two persons, but instead of this configuration, a configuration is also possible in which two seats are separately provided side by side in the left-right direction.

(4) The present invention is applicable to a work vehicle such as a utility vehicle for use for multiple purposes such as movement of personnel, transport of luggage, or recreations.

The invention claimed is:

1. A work vehicle comprising:
   left and right front wheels located in a front portion of a vehicle body of the work vehicle;
   left and right rear wheels located in a rear portion of the vehicle body;
   a driver section located at an intermediate position of the vehicle body in a front-rear direction, and including a driver seat;
   a ROPS frame comprising left and right front columns and left and right rear columns, and covering the driver section; and
   a plurality of suspension mechanisms supporting the front wheels and the rear wheels to the vehicle body such that the front wheels and the rear wheels are individually movable up and down,
   wherein the ROPS frame is attached to positions immediately above, or in a vicinity of, vehicle body-side support sections of the suspension mechanisms, and
   wherein the left and right front columns of the ROPS frame are respectively directly attached to the vehicle body-side support sections of left and right suspension mechanisms supporting the left and right front wheels, among the plurality of suspension mechanisms, the left and right front columns being directly attached by being received within the vehicle body-side support sections of the left and right suspension mechanisms.

2. The work vehicle according to claim 1, wherein:
   the ROPS frame comprises:
      a front lateral frame section connected to upper portions of the left and right front columns and extending in a left-right direction;
      a rear lateral frame section connected to upper portions of the left and right rear columns and extending in the left-right direction; and
      left and right longitudinal frame sections respectively connected to the upper portions of the left and right front columns and the upper portions of the left and right rear columns and extending in a front-rear direction, and
   the front lateral frame section is located above a front portion of the driver section, and the rear lateral frame section is located above a rear portion of the driver section.

3. The work vehicle according to claim 2,
   wherein the front column comprises a grip for an occupant.

4. The work vehicle according to claim 1, wherein the left and right front columns respectively include standing portions extending substantially vertically and rearward-inclined portions.

5. The work vehicle according to claim 1, further comprising:
   a coupling member coupling the vehicle body-side support sections of the left and right suspension mechanisms,
   wherein:
      the vehicle body-side support sections extend from the coupling member toward an inner side of the vehicle body, and
      the suspension mechanisms are attached directly to the vehicle body-side support sections at an inner side of the vehicle body from the coupling member.

* * * * *